United States Patent
Yoppolo et al.

(10) Patent No.: US 6,991,872 B2
(45) Date of Patent: Jan. 31, 2006

(54) END CAP SEAL ASSEMBLY FOR AN ELECTROCHEMICAL CELL

(75) Inventors: Robert A. Yoppolo, New Milford, CT (US); Kevin Duprey, West Hartford, CT (US); Thomas L. Lindsay, Bridgeport, CT (US); Oleg Podoprigora, New Milford, CT (US)

(73) Assignee: The Gillette Company, Boston, MA (US)

( * ) Notice: Subject to any disclaimer, the term of this patent is extended or adjusted under 35 U.S.C. 154(b) by 341 days.

(21) Appl. No.: 10/397,494

(22) Filed: Mar. 26, 2003

(65) Prior Publication Data

US 2004/0191610 A1    Sep. 30, 2004

(51) Int. Cl.
   *H01M 2/12*    (2006.01)
(52) U.S. Cl. .................... 429/56; 429/174; 429/206
(58) Field of Classification Search .................. 429/56, 429/54, 174, 206, 229, 224
   See application file for complete search history.

(56) References Cited

U.S. PATENT DOCUMENTS

| 3,314,824 | A |  | 4/1967 | Spanur ..................... 136/178 |
| 3,617,386 | A |  | 11/1971 | Bosben ..................... 136/107 |
| 4,227,701 | A |  | 10/1980 | Tsuchida et al. ............. 277/12 |
| 4,237,203 | A |  | 12/1980 | Tsuchida et al. ............ 429/122 |
| 4,539,269 | A |  | 9/1985 | Malay ........................ 429/54 |
| 5,080,985 | A |  | 1/1992 | Wiacek et al. .............. 429/172 |
| 5,422,201 | A |  | 6/1995 | Georgopoulos ............. 429/170 |
| 5,589,293 | A |  | 12/1996 | Pope et al. ................. 429/172 |
| 5,750,283 | A |  | 5/1998 | DePalma et al. ............. 429/56 |
| 5,759,713 | A |  | 6/1998 | DePalma et al. ............. 429/54 |
| 6,042,967 | A | * | 3/2000 | Sargeant et al. ............ 429/164 |
| 6,127,062 | A |  | 10/2000 | Sargeant et al. ............. 429/53 |
| 6,265,101 | B1 |  | 7/2001 | Tucholski .................... 429/163 |
| 6,270,919 | B1 |  | 8/2001 | Janmey ....................... 429/56 |
| 2002/0127470 | A1 |  | 9/2002 | Syvetrsen ................... 429/174 |

* cited by examiner

*Primary Examiner*—Patrick Joseph Ryan
*Assistant Examiner*—Thomas H. Parsons
(74) *Attorney, Agent, or Firm*—Barry D. Josephs; Thomas G. Krivulka

(57) ABSTRACT

An end cap seal assembly for an electrochemical cell such as an alkaline cell is disclosed. The end cap assembly comprises a convoluted end cap which may also function as a cell terminal and an underlying insulating sealing disk. The insulating sealing disk comprises a central boss and radially extending arm terminating in a downwardly sloped elbow and upwardly sloped peripheral edge. The end cap disk has at least one vent aperture therethrough which faces the ambient environment. The insulating disk has an annular groove in its top or bottom surface, which preferably circumvents the central boss. The base of the groove defines an a rupturable membrane portion of the insulating sealing disk. The rupturable membrane is designed to rupture, preferably when the cell internal gas pressure reaches a level between about 150 and 900 psig ($1034\times10^3$ and $6206\times10^3$ pascal gage) advantageously, between about 150 and 700 psig ($1034\times10^3$ and $4827\times10^3$ pascal gage).

48 Claims, 5 Drawing Sheets

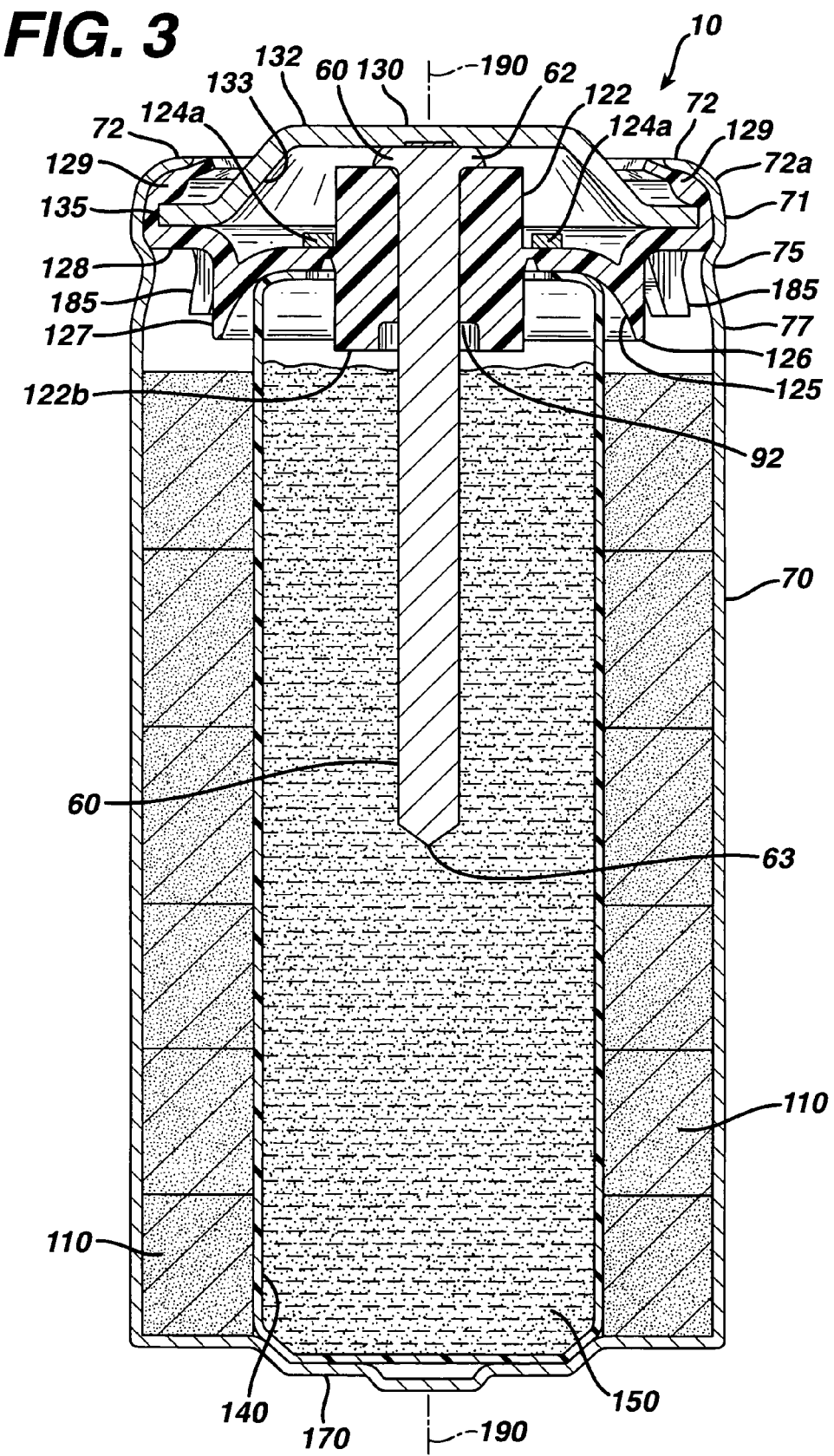

END CAP SEAL ASSEMBLY FOR AN ELECTROCHEMICAL CELL

FIELD OF THE INVENTION

The invention relates to an end cap assembly for sealing electrochemical cells, particularly alkaline cells. The invention relates to rupturable devices within the end cap assembly which allow gas to escape from the interior of the cell to the environment.

BACKGROUND

Conventional electrochemical cells, such as alkaline cells, are formed of a cylindrical housing having an open end and an end cap assembly inserted therein to seal the housing. Conventional alkaline cells typically comprise an anode comprising zinc, a cathode comprising manganese dioxide, and an alkaline electrolyte comprising aqueous potassium hydroxide. After the cell contents are supplied, the cell is closed by crimping the housing edge over the end cap assembly to provide a tight seal for the cell. The end cap assembly comprises an exposed end cap plate which functions as a cell terminal and typically a plastic insulating plug, which seals the open end of the cell housing. A problem associated with design of various electrochemical cells, particularly alkaline cells, is the tendency of the cell to produce gases as it continues to discharge beyond a certain point, normally near the point of complete exhaustion of the cell's useful capacity. Electrochemical cells, particularly alkaline cells, are conventionally provided with rupturable diaphragms or rupturable membranes within an end cap assembly. The rupturable diaphragm or membrane may be formed within a plastic insulating member as described, for example, in U.S. Pat. No. 3,617,386. Such diaphragms are designed to rupture when gas pressure within the cell exceeds a predetermined level. The end cap assembly may be provided with vent holes for the gas to escape when the diaphragm or membrane is ruptured. The end cap assembly disclosed in U.S. Pat. No. 3,617,386 discloses a grooved rupturable seal diaphragm and a separate metal contact disk between the end cap and seal diaphragm. The end cap assembly disclosed in the reference is not designed to withstand radial compressive forces and will tend to leak when the cell is subjected to extremes in hot and cold climate.

In order to provide a tight seal contemporary prior art typically disclose end cap assemblies which include a metal support disk inserted between the end cap plate and an insulating member. The separate metal support disk is radially compressed when the cell housing edge is crimped over the end cap assembly. The insulating plug is typically in the form of a plastic insulating disk which extends from the center of the cell towards the cell housing and electrically insulates the metal support disk from the cell housing. The metal support disk may have a highly convoluted surface as shown in U.S. Pat. Nos. 5,759,713 or 5,080,985 which assures that end cap assembly can withstand high radial compressive forces during crimping of the cell's housing edge around the end cap assembly. This results in a tight mechanical seal around the end cap assembly at all times.

The prior art discloses rupturable vent membranes which are integrally formed as thinned areas within the insulating disk included within the end cap assembly. Such vent membranes can be oriented such that they lie in a plane perpendicular to the cell's longitudinal axis, for example, as shown in U.S. Pat. No. 5,589,293, or they may be oriented so that they are slanted in relation to the cell's longitudinal axis as shown in U.S. Pat. No. 4,227,701. In the latter U.S. Pat. No. 4,227,701 a rupturable vent membrane is formed as an annular thinned portion on a downwardly sloping arm of the insulating sealing disk. The insulating sealing disk is slideably mounted on an elongated current collector running therethrough. As gas pressure within the cells builds up the center portion of the insulating sealing disk slides upwards towards the cell end cap, thereby stretching the membrane until it ruptures. U.S. Pat. No. 6,127,062 discloses an insulating sealing disk and an integrally formed rupturable membrane which is oriented vertically, that is, parallel to the cell's central longitudinal axis. When the gas pressure within the cell rises to a predetermined level the membrane ruptures thereby releasing the gas pressure to the external environment.

The rupturable membrane can be in the form of one or more islands of thin material within the insulating disk as shown in U.S. Pat. No. 5,589,293. Alternatively, the rupturable membrane can be in the form of a thin portion circumventing the cell' longitudinal axis as shown in U.S. Pat. No. 5,080,985. The circumventing thinned portion forming the rupturable membrane can be formed by grooves within the insulating disk as shown in U.S. Pat. No. 4,237,203. The rupturable membrane may also be a separate piece of polymeric film which is sandwiched between the metal support disk and the insulating disk and facing apertures therein as shown in patent application Publication U.S. 2002/0127470 A1. A pointed or other protruding member can be oriented above the rupturable membrane to assist in rupture of the membrane as shown in U.S. Pat. No. 3,314,824. When gas pressure within the cell becomes excessive, the membrane expands and ruptures upon contact with the pointed member, thereby allowing gas from within the cell to escape to the environment through apertures in the overlying terminal end cap.

A separate metal support disk, typically with convoluted surfaces as shown in U.S. Pat. Nos. 5,080,985 and 5,759,713, has been commonly included within the end cap assembly. The metal support disk withstands high radial compressive forces applied to the end cap assembly during crimping of the housing edge around the end cap assembly. The high radial compressive force assures that the seal between the end cap assembly can be maintained even if gas pressure within the cell builds up to a very high level, for example, between about 1100 and 1600 psig ($7585 \times 10^3$ and $11032 \times 10^3$ pascal gage).

Alkaline cell end cap assemblies which do not include a metal support disk between the insulating sealing disk and terminal end cap are shown in U.S. Pat. Nos. 3,314,824; 3,617,386; 4,227,701; 4,237,203; 4,539,269 and 5,589,293. The end cap assemblies disclosed in these references generally have a high profile, that is, occupy significant percentage of the cell's internal volume or else do not reliably withstand gas pressure buildup of even a few hundred pounds per square inch gage (psig) buildup within the cell or else are formed of materials or have weak spots within the seal which are subject to chemical attack and corrosion by alkaline electrolyte.

Accordingly, it is desirable to have an alkaline cell end cap assembly which provides a tight seal for the cell during normal cell usage, yet has a low profile.

It is desirable that the end cap assembly have an insulating sealing disk with a rupturable venting mechanism therein.

It is desirable that the end cap assembly with rupturable venting mechanism be readily manufacturable and have as few components as possible to reduce cost, yet nevertheless enable gas venting at the desired pressure level.

SUMMARY OF THE INVENTION

An aspect of the invention is directed to a low profile end cap assembly for an electrochemical cell, preferably an alkaline cell. The alkaline cell, for example, can contain a conventional anode comprising zinc and a cathode comprising manganese dioxide and conductive carbon such as graphite. An aqueous solution of potassium hydroxide electrolyte is added to the anode and cathode materials. The cell contains conventional separator between anode and cathode. The cell's outer housing is typically cylindrical having an open end and closed. The cell contents are inserted into the cell's outer housing. The end cap assembly of the invention is then inserted into the open end of the cell's outer housing and the peripheral edge of the housing is crimped around the end cap assembly to produce a tight seal closing the housing's open end. The end cap assembly is characterized in that it is composed of few components, namely a terminal end cap an underlying insulating sealing disk which electrically insulates the end cap from the outer housing. There is also an elongated current collector with one end thereof passing through the center of the insulating sealing disk and into the anode. The end cap and insulating sealing disk are placed in radial compression to achieve a tight seal. In particular the end cap assembly of the invention eliminates the need for a separate metal support disk between the end cap and the insulating sealing disk. (Such metal support disk, which the present invention eliminates, is typically employed in conventional alkaline cell end cap assemblies and placed in radial compression to reinforce the seal.)

An aspect of the invention is that the insulating sealing disk has a low profile, that is, has a relatively shallow depth. The invention is further characterized in that the end cap assembly defined by the end cap and insulating disk occupies relatively low percentage of the total volume of the cell interior. This provides for inclusion of greater amounts of anode and cathode material into the cell interior thereby extending the cell's useful service life. For example, in an AA size cell the end cap assembly comprising the end cap and insulating sealing disk has a maximum depth of between about 8 and 12 percent of the cell's total length.

The end cap is characterized in that it is thicker than end caps which are normally employed in alkaline cell. However, the end cap can be of conventional material, for example, nickel plated steel. The thickness of the end cap for AAA cells in the end cap assembly of the invention is preferably between about 0.37 and 0.50 mm. The thickness of the end cap for AA cells is preferably between about 0.50 and 0.60 mm. The thickness of the end cap for C and D cells is desirably between about 0.6 and 0.7 mm.

The insulating sealing disk is further characterized in that it has a central boss with aperture through the center thereof. The boss forms the thickest and heaviest portion of the insulating sealing disk. The circumferential outer surface of the boss terminates in a first radially extending arm which extends radially and curves downwardly from the boss surface and terminates in a downwardly protruding elbow. Another integrally formed arm extends upwardly from the elbow portion and slants slightly outwardly and terminates in a peripheral edge.

An aspect of the end cap assembly of the present invention is that it contains a venting mechanism comprising a rupturable membrane which is integrally formed from a thinned portion of the insulating sealing disk. The thinned portion can be formed by cutting an annular groove into the top or bottom surface of the radially extending arm of the insulating sealing disk, that is, the portion of sealing disk which extends radially from the boss. (Reference to top and bottom herein shall be with the cell oriented in vertical position with end cap assembly at the cell top end.) The insulating sealing disk and integral rupturable membrane are preferably formed of nylon 66 or nylon 612. The groove is preferably cut into the top or bottom surface of the radially extending arm of the insulating sealing disk using a die cutting knife and the like. The groove is preferably formed close to the point of intersection of the radially extending arm and the boss. The groove is desirably annular so that it circumvents the boss. The groove is desirably cut into the radially extending arm of the insulating sealing disk so that the groove's leading edge (groove edge nearest the boss) is within about 2 mm of the boss surface. The thickness of the radially extending arm of the insulating disk becomes reduced along the base of the annular groove to form thereby a circumferential rupturable membrane. Alternatively, the annular groove can be formed of a plurality of spaced apart or segmented straight or arcuate cuts to form a plurality of spaced apart rupturable membranes around the boss. Alternatively, the annular groove can be formed within the top or bottom surface of the radially extending arm of the sealing disk at the time of manufacture of the sealing disk, by injection molding.

An aspect of the invention is that rupture pressures of the membrane at levels between about 150 and 900 psig ($1034 \times 10^3$ and $6206 \times 10^3$ pascal gage) can be readily achieved with end cap assembly design of the invention, while assuring that a reliable seal is maintained at the open end of the cell at such pressure levels. The rupturable membrane has a thickness typically between about 0.04 and 0.40 mm, typically between about 0.13 and 0.40 mm, when nylon 612 or nylon 66 is employed, for desired rupture pressure between about 150 and 900 psig ($1034 \times 10^3$ and $6206 \times 10^3$ pascal gage). Desirably the rupture pressure of the membrane is between about 150 and 700 psig ($1034 \times 10^3$ and $4827 \times 10^3$ pascal gage), advantageously between about 150 and 600 psig ($1034 \times 10^3$ and $4137 \times 10^3$ pascal gage).

In an AA size alkaline cell utilizing the end cap assembly of the invention, the rupture pressure is preferably between about 400 and 800 psig ($2758 \times 10^3$ and $5516 \times 10^3$ pascal gage). In an AAA size alkaline cell utilizing the end cap assembly of the invention, the rupture pressure is preferably between about 500 and 900 psig ($3448 \times 10^3$ and $6206 \times 10^3$ pascal gage). In a C size alkaline cell utilizing the end cap assembly of the invention, the rupture pressure is preferably between about 200 and 400 psig ($1379 \times 10^3$ and $2758 \times 10^3$ pascal gage). In a D size alkaline cell utilizing the end cap assembly of the invention, the rupture pressure is preferably between about 150 and 250 psig ($1034 \times 10^3$ and $1724 \times 10^3$ pascal gage).

A reliable seal, readily withstanding any of the above stated pressure levels is achieved despite the fact that the end cap assembly of the invention is composed essentially of only two structural components, namely a terminal end cap and underlying insulating sealing disk, which are under radial compression to seal the open end of the cell housing.

BRIEF DESCRIPTION OF THE DRAWINGS

The invention will be better understood with reference to the drawings in which:

FIG. 3 is a cross sectional view of an alkaline cell containing the end cap assembly of the invention shown in FIG. 1.

DETAILED DESCRIPTION

Figure 1:
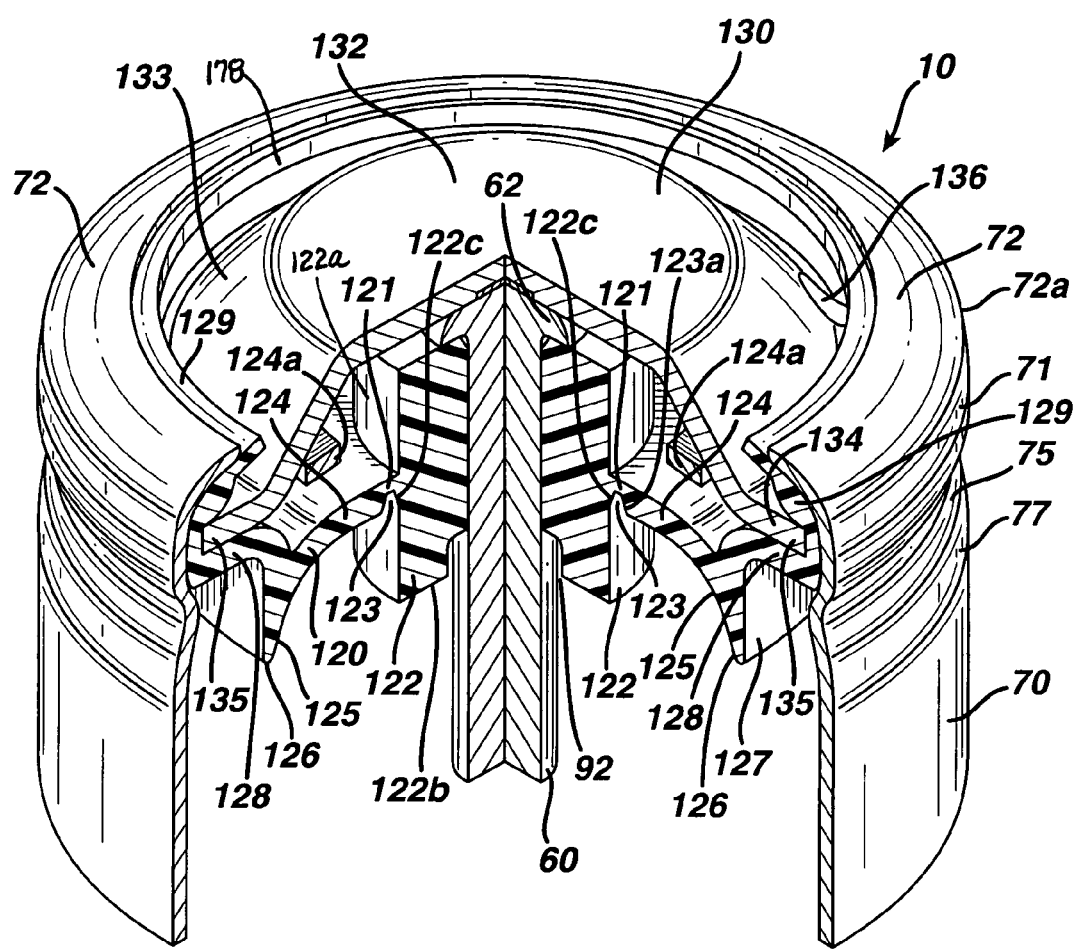
FIG. 1 is a cut-away view of the end cap assembly of the invention.
Figure 2:
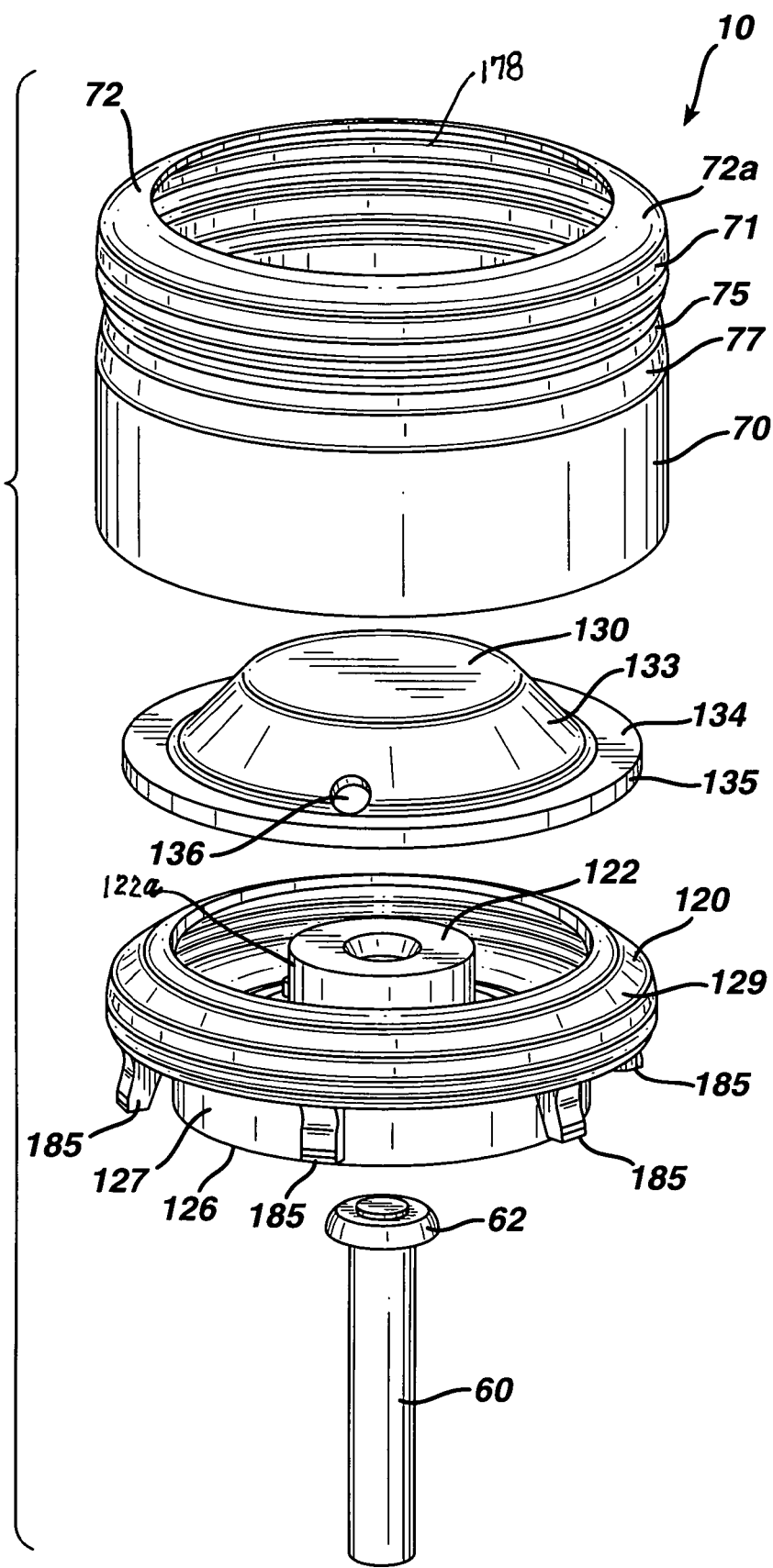
FIG. 2 is an exploded view of the components of the end cap assembly shown in FIG. 1.
Figure 2A:
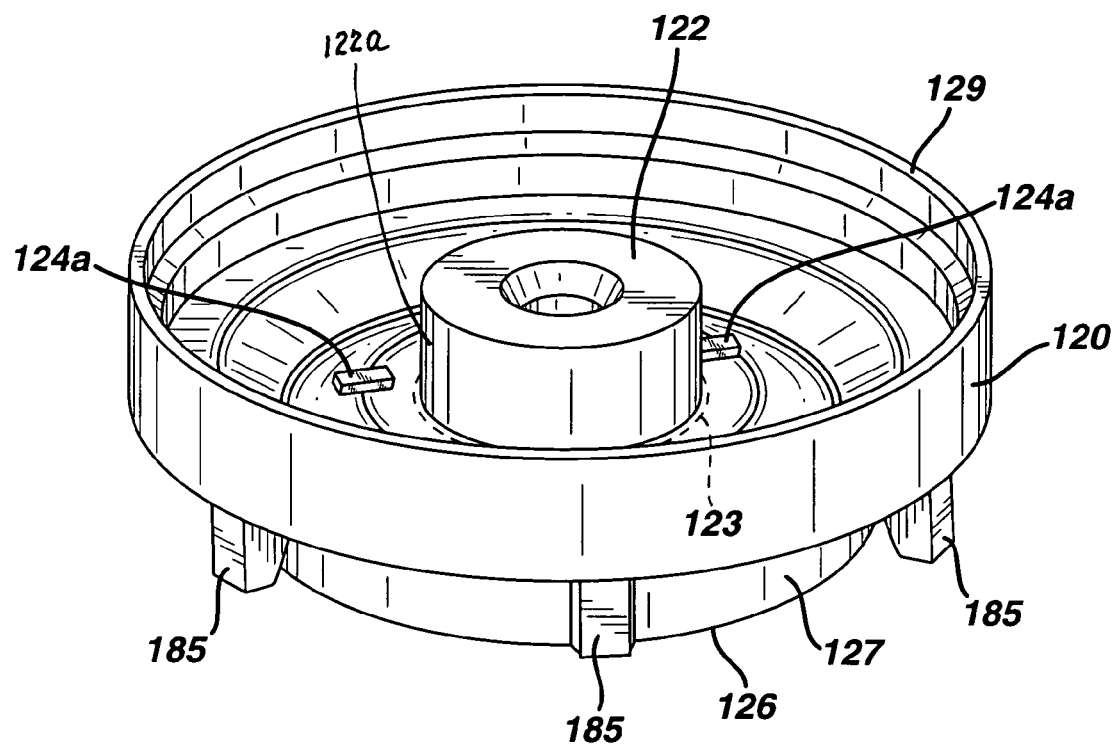
FIG. 2A is an enlarged pictorial view of the insulating sealing disk of FIG. 1 before it has been crimped in place within the cell.

A preferred structure of the end cap assembly 10 of the invention is illustrated in FIG. 1. An exploded view of the components of the end cap assembly 10 is shown in FIG. 2. An enlarged pictorial view of the insulating sealing disk before it is crimped into the cell is shown in FIG. 2A. A specific embodiment of the end cap assembly 10 integrated into an alkaline cell 100 is illustrated in FIG. 3. The end cap assembly 10 is applicable to cylindrical electrochemical cells, particularly cylindrical alkaline cells of standard AAA (44×9 mm), AA (49×12 mm), C (49×25 mm) and D (58×32 mm) size. The end cap assembly 10 provides a seal for the open end of cell housing (casing) 70 and also has incorporated therein exposed end cap 130. End cap 130 is in the form of a disk and may function as one of the cell's terminal's (negative terminal for alkaline cell) as shown in FIG. 3. The end cap 130 is also of a structure causing it to function as a radial spring. This allows the end cap assembly 10 to withstand high radial compressive forces when the cell's housing 70 is crimped around the end cap assembly and provides a tight seal even though the cell may be exposed to extremes in cold and hot environmental temperature. The end cap assembly 10 of the invention has a low profile, that is, of small depth relative to the cell's length. End cap assembly 10 also occupies less space within the cell than conventional radially compressive end cap assemblies for alkaline cells. This allows for inclusion of additional anode and cathode active material to increase cell capacity.

End cap assembly 10 of the invention in the representative embodiment (FIGS. 1–3) is comprised of an end cap disk 130, an electrically insulating member 120, and elongated current collector 60. The insulating member 120 is preferably in the form of an insulating sealing disk (grommet) having a convoluted surface. Insulating sealing disk 120 has a thick central boss 122 with an aperture 92 passing therethrough for receiving a metal current collector 60. Current collector 60 can be in the form of an elongated nail, preferably having an integrally formed nub or flange 62 at one end. Thus, when assembling the end cap assembly 10, current collector 60 is inserted through aperture 92 by pushing or hammering tip 63 through aperture 92 until nub 62 comes to rest against the top surface of boss 122 (FIG. 1). Preferably, the surface of current collector 60 is coated with a sealing material such as asphalt coating before insertion into aperture 92. Alternatively, the surface defining aperture 92 can be precoated with such asphalt coating before the current collector 60 is inserted therethrough. Nub 62 can be welded to the bottom surface of end cap 130, for example, by electrical resistance welding, so that the current collector 60 is in electrical contact with end cap 130. In such embodiment the boss 122 is immobilized and cannot slide along current collector 60 as gas pressure within the cell increases.

The end cap disk 130 is of metal, preferably nickel plated steel having a convoluted surface. End cap 130 has a wall thickness desirably between about 0.37 and 0.50 mm, preferably about 0.37 mm for AAA size cells. End cap 130 has a wall thickness desirably between about 0.5 and 0.6 mm, preferably about 0.5 mm for AA size cells. End cap 130 has a wall thickness desirably between about 0.6 and 0.7 mm, preferably about 0.6 for C and D size cells. Such thickness is higher than the wall thickness, typically between about 0.20 and 0.25 mm, of conventional terminal end caps employed in contemporary alkaline cells. End cap disk 130 preferably has a flat central surface 132 which extends radially to encompass the majority of the disk 130 radius, desirably between about 65 to 75 percent of the disk radius. Flat central surface 132 terminates in downwardly extending wall 133, which may be slanted slightly outwardly as shown in FIG. 1. Wall 133 may also be in vertical alignment, that is, parallel to the cell's longitudinal axis 190. There is preferably one or several vent apertures 136 in downwardly extending wall 133. Downwardly extending wall 133 terminates in radially extending arm 134, which forms the peripheral edge of end cap 130. Radially ending arm 134 desirably envelops between about 25 and 35 percent of the end cap disk 130 radius. Peripheral edge 134 terminates in end flange 135.

After the end cap assembly 10 is inserted into the housing open end 178, the cell's housing edge 72 is crimped over peripheral edge 129 of insulating sealing disk 120. Housing edge 72 is then radially compressed so that end flange 135 of end cap 130 bites into the inside surface of said peripheral edge 129. Peripheral edge 129 of insulating sealing disk 120 electrically insulates end cap 130 from housing 70. End cap 130 and insulating sealing disk 120 are placed in radial compression to provide a tight seal closing the open end 178 of the housing. End cap 130 and insulating sealing disk 120 of the invention can readily be placed in radial compression in amount so that the wall thickness of the sealing disk is reduced by between about 35 and 45 percent of its installed (uncompressed) thickness, despite the fact that there are no metal support disks, that is, other than end cap 130 employed in the end cap assembly 10.

An advantage of the invention as illustrated in FIGS. 1–3 is that end cap disk 130 functions as both a cell terminal and metal support disk which can withstand high radial compressive forces and in effect functions as a radial spring thereby assuring a tight seal regardless of whether the cell is exposed to extremes in hot and cold climate. End cap 130 preferably also contains one or more vent apertures 136 through which gas may escape to the environment as gas within the cell interior permeates through membrane 121 or when membrane 121 ruptures.

Insulating sealing disk 120 may be formed of a single piece construction of plastic or polymeric insulating material. The material must be electrically resistant and sufficiently durable to withstand attack by aqueous alkaline solution, typically aqueous potassium hydroxide. The material should have good mechanical stress resistant properties and preferably is permeable to hydrogen gas. Preferably insulating sealing disk 120 is molded by injection molding nylon 66 which is durable and corrosion resistant to alkaline. Alternatively, it can be molded of nylon 612. Although nylon 66 or 612 are preferred materials for insulating sealing disk 120, it is not intended to limit disk 120 to these materials, since other nylon grades could also be employed as well as polypropylene, talc filled polypropylene, polyethylene and sulfonated polyethylene and the like.

As illustrated best in FIGS. 1 and 2, insulating sealing disk 120 has a central boss 122 with aperture 92 through the center thereof and protruding legs 185. Boss 122 forms the thickest and heaviest portion of disk 120. Boss 122 has a diameter which comprises between about 20 and 35 percent of the insulating disk 120 diameter. The circumferential outer surface 122a of boss 122 terminates in a first radially extending arm 124 which extends radially to protruding elbow 126 in amount between about 40 and 60 percent of the seal disk 120 radius. Arm 124 curves slightly downwardly as it extends radially from boss 122. Arm 124 extends downwardly to portion 125 which terminates in downwardly protruding elbow 126. Either the bottom surface 122b of boss 122 or bottom end of elbow 126 can forms the most bottom point of the insulating disk 120 as shown in FIG. 1. In the embodiment shown in FIG. 1 the bottom surface 122b of boss 122 forms the most bottom point of insulating sealing disk 120. An arm 127 extends upwardly from elbow 126. Arm 127 is slanted slightly outwardly as it extends radially from elbow 126 as shown best in FIG. 1. Upwardly extending arm 127 terminates in second radially extending arm 128 which terminates in upwardly extending peripheral edge 129 of insulating sealing disk 120. It will be appreciated that boss 122, first radial arm 124, elbow 126, upwardly extending arm 127, second radially extending arm 128, and peripheral edge 129 are all integrally formed during molding of seal disk 120.

Figure 1A:
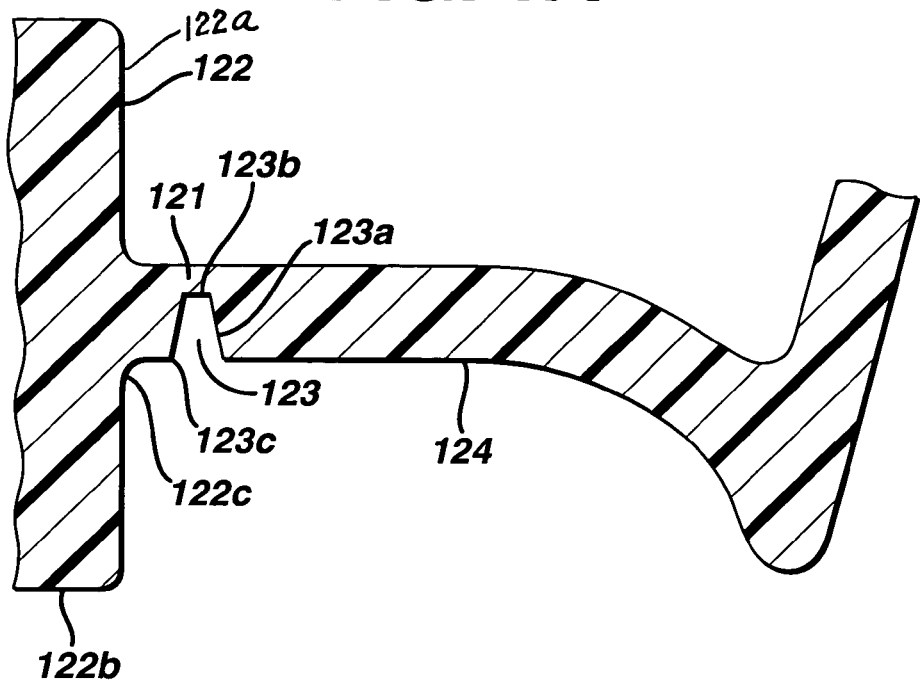
FIG. 1A is an enlarged cross sectional view of a portion of the insulating sealing disk of FIG. 1 showing the groove cut into the bottom surface of said sealing disk.
Figure 1B:
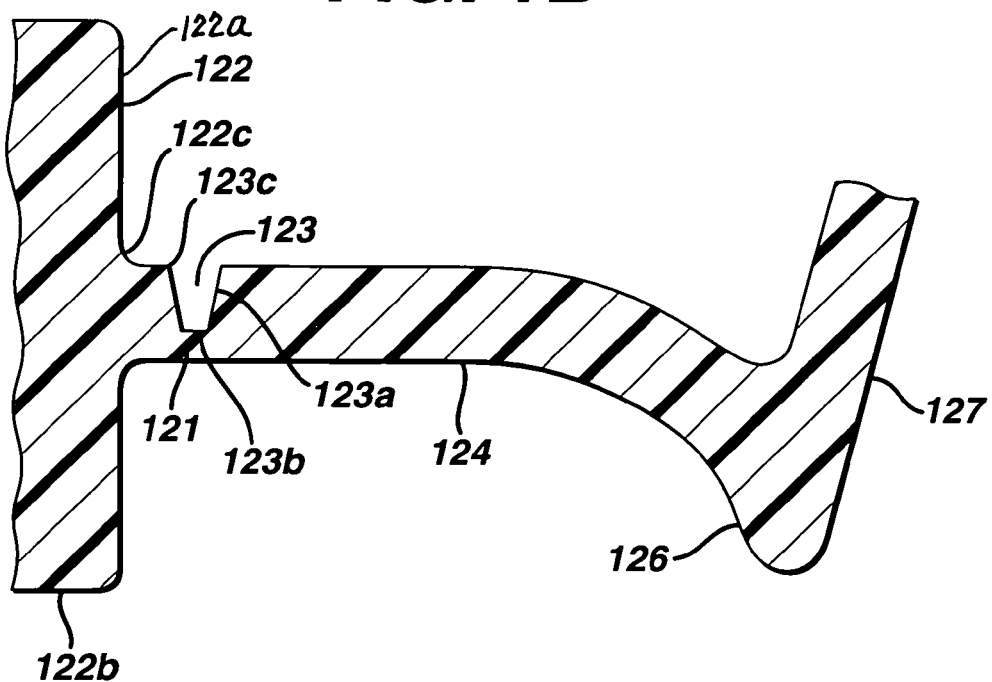
FIG. 1B is an enlarged cross sectional view of an alternate embodiment showing the groove cut into the top surface of the insulating sealing disk.

Preferably, a circumferential rupturable membrane 121 is formed by cutting or scoring radially extending arm 124, just at or near the point that arm 124 extends from boss 122. The cutting or scoring can be conveniently accomplished with an automated cutting tool after the seal disk 120 is molded. The cutting produces an annular or circumferential groove 123 in radially extending arm 124. Groove 123 has an open end and opposing closed base wherein the base of the groove forms a thinned rupturable membrane portion 121. Groove 123 is preferably formed of a continuous circumferential cut on the bottom surface of radially extending arm 124 of sealing disk 120 as shown in FIGS. 1 and 1A. Alternatively, groove 123 can be made along the top surface of radially extending arm 124 of sealing disk 120 as shown in FIG. 1B. Groove 123 can be made by die cutting, for example, using a cutting knife applied to either the bottom (or top) surface of radially extending arm 124 after the sealing disk 120 has been molded. This procedure may also be referred to herein as scoring. When groove 123 is made by die cutting, the groove is preferably located with its leading edge 123c at or near the junction 122c of radially extending arm 124 and boss 122. Desirably leading edge 123c of groove 123 is within about 2 mm of boss 122. Preferably leading edge 123c of groove 123 is within about 0.1 to 0.5 millimeters of said junction 122c.

Groove 123 can also be formed during molding of seal disk 120, that is, without need of a separate die cutting (scoring) step. In such case groove 123 can be located at the bottom surface (FIG. 1A) of radially extending arm 124 so that its near edge 123c is very close to, preferably right at the junction 122c of radially extending arm 124 and boss 122. Alternatively, groove 123 made during molding of seal disk 120, can be located at the top surface (FIG. 1B) of radially extending arm 124, with the near edge 123c of groove 123 located very close to, preferably right at the junction 122c of radially extending arm 124 and boss 122. Location of groove 123 at or near junction 122c helps achieve the desired lower burst pressures between about 150 and 900 psig ($1034 \times 10^3$ and $6206 \times 10^3$ pascal gage), preferably between about 150 and 700 psig ($1034 \times 10^3$ and $4827 \times 10^3$ pascal gage). Although groove 123 can be formed by either molding or separate die cutting (scoring), the die cutting (scoring) method generally makes it easier to form grooves of deeper cut, thereby facilitating the manufacture of a very thin rupturable membrane 121 adjacent groove base 123b. Such very thin rupturable membrane 121 (typically between about 0.04 mm and 0.08 mm for nylon 66 or 612) is needed when it is desired to have membrane 121 burst at relatively low pressure, for example, between about 150 and 600 psig ($1034 \times 10^3$ and $4137 \times 10^3$ pascal gage). Annular groove 123 can be made by applying a cutting knife to either the top surface or bottom surface of radially extending arm 124 of insulating sealing disk 120. The knife itself can have a cutting blade thickness typically ranging from that of a razor blade to that of a hunting knife. The cutting knife desirably has a blade with a V shaped cutting angle measuring between about 5 and 30 degrees. The width of the cut groove at groove base 123b, for example, may desirably be between about 0.1 and 1.0 mm with nylon. If annular groove 123 is made during molding the insulating sealing disk 120 of nylon, the width of the groove at groove base 123b may be between about 0.1 and 0.4 mm, desirably between about 0.25 and 0.4 mm.

Although annular groove 123 is preferably a continuous circumferential groove circumventing boss 122, it is not intended to limit groove 123 to such configuration. Instead of being a continuous circumferential groove, e.g. forming a circle or ellipse around boss 122, groove 123 can be formed of a plurality of segmented straight or arcuate cuts in the top or bottom surface of radially extending arm 124. Such segmented straight or arcuate cuts can be spaced apart so that they trace a circular or elliptical path around boss 122. In this latter case a plurality of segmented rupturable membrane portions 121 are formed around boss 122.

Preferably there is a plurality of spaced apart, preferably elongated ribs 124a protruding from the top surface of radially extending arm 124 as shown in FIGS. 1 and 2. Such ribs are integrally formed with the insulating sealing disk 120. Ribs 124a function to prevent any portion of the radially extending arm 124 from covering vent aperture 136 when membrane 121 ruptures and portions of arm 124 fly upwards into the vicinity of end cap 130. Thus, ribs 124a are aligned so that they may lodge against the under surface of end cap 130 in a region of the end cap away from vent aperture 136 when membrane 121 ruptures causing arm 124 to fly upwards.

Although the circumferential groove 123 is preferably formed at the bottom surface of radially extending arm 124 (FIGS. 1 and 1A), it can be formed instead along the top surface of said radially extending arm 124 at or near the junction of arm 124 and boss 122 as shown in FIG. 1B. In such latter case the circumferential groove 123 would face the interior of the cell. In either case whether groove 123 is at the top or bottom surface of radially extending arm 124, the resulting effect is that the thickness of arm 124 is reduced at the base of the groove to produce a circumferential rupturable membrane 121 therefrom.

The size, shape and depth of the groove 123 can be controlled by the shape of the cutting tool and depth of cut used in scoring radially extending arm 124. The cutting tool, for example, can be a knife having a circumferential blade. Such blade can be pressed vertically in one stroke onto the top surface of radially extending arm 124 to form the cut or groove 123 defining the underlying annular rupturable membrane portion 121. The opposing groove walls 123a defining the depth of groove 123 do not have to be of any particular shape or curvature. However, from the standpoint of ease of manufacture the groove walls 123a can be vertical, that is, parallel to the cell's central longitudinal axis 190, or preferably are in a V shape so that the mouth of the groove is somewhat wider than the base. The rupturable membrane portion 121 underlies the base (closed end) of such V shaped groove as shown in FIGS. 1 and 1A. The V shape cut (FIG. 1A) forms a circumferential groove 123 which can be readily formed with an external cutting tool. The V shape cut as shown in FIGS. 1 and 1A has nearly vertical side walls 123a (within about 30 degrees of vertical), but the angle of the V shape cut can be altered so that the side walls are less sharply sloping. The angle of such V shape groove walls does not appear to play a significant factor in the rupturability of membrane 121, since the membrane ruptures primarily in tension, not shear. The width of the rupturable membrane is defined by the width of the base of groove 123. For example, in the V shaped groove 123 shown best in FIG. 1A, the width of the underlying rupturable membrane is defined as the width of the base 123b of the V shape.

An anticorrosion coating can optionally be applied to the undersurface of insulating sealing disk 120. Such coating should be electrochemically inert to the anode 150. Although nylon 66 or nylon 612, the preferred material for insulating sealing disk 120, is resistant to attack by alkaline electrolyte, added protection can be afforded by coating the undersurface of insulating disk 120. Such coating is especially desirable if other material are employed, for example, polypropylene, talc filled polypropylene, sulfonated polyethylene or polyamide (nylon) grades other than nylon 66 or nylon 612. A suitable anticorrosive coating can be selected from a wide range of inert anticorrosive materials which can be conveniently sprayed or coated onto the desired surface. Preferred inert anticorrosive nonwetting coatings, for example, can be of Teflon (tetrafluoroethylene) or asphalt or polyamide. Such anticorrosive coating material is advantageously applied to the portion of the bottom surface of insulating sealing disk 120 (FIG. 1) immediately underlying rupturable membrane 121. This provides particular protection to the membrane 121. However, the coating can be applied to the entire undersurface of insulating sealing disk 120, if desired. Such coating or other sealant material, for example, asphalt or polyamide coating, can also be applied between the edge 129 of insulating sealing disk 120 and housing 70.

The desired rupture pressure of the rupturable membrane 121 within end cap assembly 10 of the invention, is desirably between about 150 and 900 psig ($1034\times10^3$ and $6206\times10^3$ pascal gage), preferably between about 150 and 700 psig ($1034\times10^3$ and $4827\times10^3$ pascal gage). Advantageously, the rupture pressure of membrane 121 can be between about 150 and 600 psig ($1034\times10^3$ and $4137\times10^3$ pascal gage) or even between about 200 and 600 psig ($1379\times10^3$ and $4137\times10^3$ pascal gage).

In order to achieve a membrane 121 (Nylon 66 or 612), which will burst when the gas pressure within the cell reaches a level of between about 150 and 900 psig ($1034\times10^3$ and $6206\times10^3$ pascal gage), it has been determined that a cut or groove 123 can be made in radially extending arm 124 to form a rupturable membrane 121 having a thickness of between about 0.04 and 0.40 mm. To achieve a membrane 121 (Nylon 66 or 612), which will burst when the gas pressure within the cell reaches a level of between about 150 and 700 psig ($1034\times10^3$ and $4827\times10^3$ pascal gage), the cut or groove 123 can be made in radially extending arm 124 to form a rupturable membrane 121 having a thickness of between about 0.04 and 0.32 mm. To achieve a membrane 121 (Nylon 66 or 612), which will burst when the gas pressure within the cell reaches a level of between about 150 and 600 psig ($1034\times10^3$ and $4137\times10^3$ pascal gage), the cut or groove 123 can be made in radially extending arm 124 to form a rupturable membrane 121 having a thickness of between about 0.04 and 0.25 mm.

The following examples pertain to grooves 123 made by die cutting, that is, by using a cutting knife applied to either the top or bottom surface of radially extending arm 124 of insulating sealing disk 120:

By way of example, for an AA cell, with a thickness of the first radially extending arm 124 desirably between 0.35 mm and 0.45 mm, and an annular rupturable membrane 121 of thickness desirably between 0.04 mm and 0.08 mm resulting from die cutting radially extending arm 124, the expected burst pressure of the cell will be between 400 and 800 psig, respectively ($2758\times10^3$ and $5516\times10^3$ pascal gage). Maintaining these dimensions (radially extending arm 124 thickness between 0.35 mm and 0.45 mm and annular membrane 121 thickness between 0.04 and 0.08 mm) and using the same cutting knife, but varying cell size, would result in a seal which will burst when the pressure inside the cell reaches between 150 to 250 psig, respectively ($1034\times10^3$ and $1724\times10^3$ pascal gage) for a D cell; between 200 to 400 psig, respectively ($1379\times10^3$ and $2758\times10^3$ pascal gage) for a C cell; and between 500 to 900 psig, respectively ($3448\times10^3$ and $6206\times10^3$ pascal gage) for an AAA cell. Preferably, the cutting knife has a V shaped blade edge forming an angle of between about 5 and 30 degrees. The cutting knife may typically have a sharp cutting blade edge such that the width of the groove base 123b at the apex of the V is very narrow, for example, between about 0.1 and 1.0 mm. Optionally the cutting knife can be preheated to a temperature, preferably above the melting point of the insulating seal 120, for example, between about 450° F. and 600° F. or even higher to facilitate its cutting into the nylon insulating seal 120.

The following examples pertain to grooves 123 at the top or bottom surface of radially extending arm 124, wherein the grooves 123 are made during the molding of insulating sealing disk 120.

By way of example, for an AA cell, with a thickness of the first radially extending arm 124 desirably between 0.35 mm and 0.45 mm, and an annular rupturable membrane 121 of thickness desirably between 0.15 mm and 0.25 mm resulting from forming annular groove 123 during molding of insulating seal disk 120, the expected burst pressure of the cell will be between 400 and 800 psig, respectively ($2758\times10^3$ and $5516\times10^3$ pascal gage). For this example the groove 123 has a width at its base 123b of 0.30 mm. Maintaining these dimensions (radially extending arm 124 thickness between 0.35 mm and 0.45 mm and annular membrane 121 thickness between 0.15 and 0.25 mm and same groove width) but varying cell size, would result in a seal which will burst when the pressure inside the cell reaches between 150 to 250 psig, respectively ($1034\times10^3$ and $1724\times10^3$ pascal gage) for a D cell; between 200 to 400 psig, respectively ($1379\times10^3$ and $2758\times10^3$ pascal gage) for a C cell; and between 500 to 900 psig, respectively ($3448\times10^3$ and $6206\times10^3$ pascal gage) for an AAA cell.

The membrane 121 thicknesses for molded grooves 123 are desirably between about 0.15 and 0.4 mm, preferably between about 0.15 mm and 0.25 mm. The width at groove base 123b for molded grooves herein described may be between about 0.25 and 0.4 mm, preferably between about 0.25 and 0.30 mm. It is desirable to have the width of groove base 123b small, since the smaller groove base width results in less elongation before rupture occurs. This in turn reduces the vent space needed above the seal. When membrane 121 has thickness of between about 0.15 and 0.25, the molded groove base 123b width is preferably between about 0.1 and 0.25 mm. When groove 123 is formed by molding, the groove side walls 123a preferably form an angle of between about 0 and 20 degrees from longitudinal axis 190.

The width of the membrane 121 can be defined by the width of groove 123 at the base surface 123b of groove 123. Groove 123 can be of varying shape. Conveniently groove 123 can be of V shape, since such shape is readily made with available cutting tools. If a V cut is used to form groove 123, the angle formed by the of the side walls 123a is desirably less than about 30 degrees). Conveniently, side walls 123a can be between about 0 and 20 degrees from vertical (from longitudinal axis 190) when groove 123 is formed by molding. Having the groove side walls 123a close to vertical is desirable, since it tends to result in a clean break when the membrane 121 burst pressure is reached.

The following are preferred dimensions for the insulating sealing disk 120 composed of nylon 66 or nylon 612:

For the AA size alkaline cell shown in (FIG. 1) there is a circumferential rupturable membrane 121 at or near the juncture of radially extending arm 124 and boss 122. Rupture membrane 121 can be designed to rupture when gas within the cell reaches a pressure between about 150 and 900 psig ($1034\times10^3$ and $6206\times10^3$ pascal gage). However, it is desirable for the AA size cell to have a circumferential membrane 121 which ruptures when gas within the cell reaches a pressure of between about 400 and 800 psig ($2758\times10^3$ and $5516\times10^3$ pascal. (The thickness of first radially extending arm 124 is desirably between about 0.35 and 0.45 mm. The length of radial arm 124 from boss 122 to elbow 126 is about 3.41 mm for the AA alkaline cell. Radially extending arm 124 is downward sloping and concaved, between about 45 and 85 degrees from vertical, that is, from longitudinal axis 190. Insulating sealing disk 120 and membrane 121 are preferably of nylon 66 or nylon 612. The vertical thickness of elbow 126 for the AA alkaline cell is between about 0.5 and 1.5 mm, typically about 1.25 mm. The thickness of the second radially extending arm 128 is between about 0.4 and 0.6 mm and its length is between about 1.0 and 1.5 mm. The diameter of boss 122 is desirably between about 3 and 4 mm, preferably between about 3.8 and 4.0 mm. The length of boss 122 (FIG. 1) is between about 3 and 5 mm, desirably about 4.5 mm. The length of boss 122 can be shortened by between about 1.5 and 3.5 mm, resulting in a boss 122 length typically of about 1.75 mm, if current collector 60 is provided with a flange (not shown) which comes to rest against the boss bottom surface 122b. Such flange, for example, can be shaped as flange or rivet 62 but would come to rest against the bottom surface 122b instead of the top surface of boss 122 shown in FIG. 1. In such case (not shown) current collector 60 can be inserted through the bottom of aperture 92 with the top of the protruding current collector 60 then welded to end cap 130. Such design provides boss 122 with additional stress support as well as additional anticorrosion protection, thereby allowing for a reduction in the boss 122 length.

In the configuration shown in FIG. 1 end cap 130 is desirably of nickel plated steel and has a thickness between about 0.5 and 0.6 mm for AA size alkaline cells. This is about twice the thickness conventionally employed in end caps for AA size cells. The housing 70 wall thickness, as well as housing peripheral edge 72, can be between about 0.15 and 0.25 mm, desirably about 0.2 mm. The total depth of the insulating sealing disk 120 shown in FIG. 1 (distance between top and bottom surface of boss 122) is preferably between about 3 and 5 mm for the AA size cell. This convert's to between about 6 and 10 percent of the cell's total length. The maximum depth of end cap assembly 10 (distance between top surface of end cap 130 and most bottom surface 122b of boss 122 for the embodiment of FIG. 1) is between about 4 and 6 mm for an AA cell. This convert's to between about 8 and 12 percent of the cell's total length.

The end cap assembly 10 of the invention as represented in FIG. 1 having the above described configuration and dimensions allows for greater amount of anode and cathode materials to be inserted into the cell interior. This leads to increased cell service life. Specifically, with the end cap assembly 10 design herein described the amount of total anode and cathode material for the AA size cell feasibly can comprise between about 80 and 95 percent by volume of the cell's interior volume as defined by housing 70. For the purposes of this calculation the cell interior volume is defined by the inside surface of housing 70 from the bottom surface of housing crimp 72 to the inside surface of opposing closed end 170.

The AAA size alkaline cell can be designed to have a circumferential vent membrane 121 to rupture when gas pressure within the cell reaches between about 150 and 900 psig ($1034\times10^3$ and $6206\times10^3$ pascal gage). However, it is preferred that vent membrane 121 for the AAA cell be designed to rupture when gas pressure within the cell reaches a pressure level between about 500 and 900 psig ($3448\times10^3$ and $6206\times10^3$ pascal gage). For the AAA size alkaline cell in the embodiment of FIG. 1 there is a circumferential rupturable membrane 121 at or near the juncture of radially extending arm 124 and boss 122. The thickness of first radially extending arm 124 is desirably between about 0.35 and 0.45 mm. Radially extending arm 124 is downward sloping and concaved between about 45 and 85 degrees from vertical, that is, from longitudinal axis 190. Insulating sealing disk 120 and membrane 121 are preferably of nylon 66 or nylon 612. In the configuration shown in FIG. 1 end cap 130 is preferably of nickel plated steel and desirably has a thickness between about 0.37 and 0.50 mm. Such end cap 130 thickness is greater than the thickness conventionally employed for AAA size alkaline cell end caps. The housing 70 wall thickness, as well as housing peripheral edge 72, can be between about 0.15 and 0.25 mm, desirably about 0.2 mm. The maximum depth of end cap assembly 10 (distance between top surface of end cap 130 and bottom surface 122b of boss 122 for the embodiment of FIG. 1 is between about 3.8 and 4.2 mm for a AAA size cell. This convert's to between about 8 and 10 percent of the cell's total length.

The end cap assembly 10 of the invention as represented in FIG. 1 having the above described configuration and dimensions allows for greater amount of anode and cathode materials to be inserted into the cell interior. This leads to increased cell service life. Specifically, with the end cap assembly 10 design herein described the amount of anode and cathode materials for the AAA size cell feasibly can comprise between about 80 and 85 percent by volume of the cell's interior volume as defined by housing 70. (The cell interior volume is defined by the inside surface of housing 70 from the bottom surface of housing crimp 72 to the inside surface of opposing closed end 170.)

The C size alkaline cell can be designed to have a circumferential vent membrane 121 to rupture when gas pressure within the cell reaches between about 150 and 900 psig ($1034\times10^3$ and $6206\times10^3$ pascal gage). However, it is preferred that vent membrane 121 for the C cell be designed to rupture when gas pressure within the cell reaches a pressure level between about 200 and 400 psig ($1379\times10^3$ and $2758\times10^3$ pascal gage). For the C size alkaline cell in the embodiment of FIG. 1 there is a circumferential rupturable membrane 121 at or near the juncture of radially extending arm 124 and boss 122. The thickness of first radially extending arm 124 is desirably between about 0.6 and 0.8 mm. Radially extending arm 124 is downward sloping and concaved between about 45 and 85 degrees from vertical, that is, from longitudinal axis 190. Insulating sealing disk 120 and membrane 121 are preferably of nylon 66 or nylon 612. In the configuration shown in FIG. 1 end cap 130 is preferably of nickel plated steel and desirably has a thickness between about 0.6 and 0.7 mm. Such end cap 130 thickness is greater than the thickness conventionally employed for C size alkaline cell end caps. The housing 70 wall thickness, as well as housing peripheral edge 72, can be between about 0.15 and 0.25 mm, desirably about 0.2 mm. The maximum depth of end cap assembly 10 (distance between top surface of end cap 130 and bottom surface 122b of boss 122 for the embodiment of FIG. 1 is between about 5 and 6 mm for a C size cell. This convert's to between about 10 and 12 percent of the cell's total length.

The end cap assembly 10 of the invention as represented in FIG. 1 having the above described configuration and dimensions allows for greater amount of anode and cathode materials to be inserted into the cell interior. This leads to increased cell service life. Specifically, with the end cap assembly 10 design herein described the amount of anode and cathode active materials for the C size cell feasibly can comprise between about 80 and 88 percent by volume of the cell's interior volume as defined by housing 70. (The cell interior volume is defined by the inside surface of housing 70 from the bottom surface of housing crimp 72 to the inside surface of opposing closed end 170.)

The D size alkaline cell can be designed to have a circumferential vent membrane 121 to rupture when gas pressure within the cell reaches between about 150 and 900 psig ($1034\times10^3$ and $6206\times10^3$ pascal gage). However, it is preferred that vent membrane 121 for the D cell be designed to rupture when gas pressure within the cell reaches a pressure level between about 150 and 250 psig ($1034\times10^3$ and $1724\times10^3$ pascal gage). For the D size alkaline cell in the embodiment of FIG. 1 there is a circumferential rupturable membrane 121 at or near the juncture of radially extending arm 124 and boss 122. The thickness of first radially extending arm 124 is desirably between about 0.7 and 0.8 mm. Radially extending arm 124 is downward sloping and concaved between about 45 and 85 degrees from vertical, that is, from longitudinal axis 190. Insulating sealing disk 120 and membrane 121 are preferably of nylon 66 or nylon 612. In the configuration shown in FIG. 1 end cap 130 is preferably of nickel plated steel desirably having a thickness between about 0.6 and 0.7 mm. Such end cap 130 thickness is greater than the thickness conventionally employed for D size alkaline cell end caps. The housing 70 wall thickness, as well as housing peripheral edge 72 can be between about 0.15 and 0.25 mm, desirably about 0.2 mm. The maximum depth of end cap assembly 10 (distance between top surface of end cap 130 and bottom surface 122b of boss 122 is between about 5.3 and 6.0 mm for a D size cell. This convert's to between about 8.5 and 10.5 percent of the cell's total length.

The end cap assembly 10 of the invention as represented in FIG. 1 having the above described configuration and dimensions allows for greater amount of anode and cathode materials to be inserted into the cell interior. This leads to increased cell service life. Specifically, with the end cap assembly 10 design herein described the amount of anode and cathode active materials for the D size cell feasibly can comprise between about 85 and 93 percent by volume of the cell's interior volume as defined by housing 70. (The cell interior volume is defined by the inside surface of housing 70 from the bottom surface of housing crimp 72 to the inside surface of opposing closed end 170.)

The end cap assembly 10 of the invention is preferably inserted into the open end of an alkaline cell. A housing of a casing of a representative alkaline cell is shown in FIG. 3. Such alkaline cells have a cylindrical housing (casing) 70 initially formed with one end 170 closed and the opposite end 178 open. Alkaline cells have an anode comprising zinc, a cathode comprising manganese dioxide, an electrolyte of potassium hydroxide and a separator 140 material. The separator 140 for alkaline cells are well known and typically comprise cellulosic and polyvinylalcohol fibers. Separator 140 may be formed of a dual layer, one of cellulosic fiber and the other comprising polyvinylalcohol and cellulosic fiber. After the cell is filled with anode and cathode active material, an end cap assembly 10 is ready for insertion into the open end to seal the cell.

Materials of construction for housing 70 may preferably be nickel plated steel. End cap 130 is constructed of a conductive metal having good mechanical strength and corrosion resistance such as nickel plated cold rolled steel or stainless steel, preferably, nickel plated low carbon steel. Insulating sealing disk 120 and integral rupturable membrane 121 may be composed of a durable, corrosion resistant plastic which is permeable to hydrogen and which at appropriate thickness forms a rupturable membrane. Insulating disk 120 and integral rupturable membrane 121 may be composed of a polyamide (nylon), preferably nylon 66 but may also be of nylon 612. Alternatively, insulating disk 120 and membrane 121 may be composed of polypropylene, talc filled polypropylene, sulfonated polyethylene or other polyamide (nylon) grades. Current collector 60 can be selected from a variety of known electrically conductive metals found to be useful as current collector materials, for example, brass, tin plated brass, bronze, copper or indium plated brass.

In manufacture once current collector 60 is inserted through insulating sealing disk 120 and welded to the end cap 130 forming end cap assembly 10, the end cap assembly 10 may then be fitted into the open end of a filled cell housing 70 (FIG. 3). End cap assembly 10 is inserted into cell 100 so that the bottom of peripheral edge 129 of the insulating sealing disk rests on circumferential bead 75. Bead 75 is formed by a circumferential indentation in the surface of cell housing 70 near the open end of the cell. Circumferential bead 75 provides a shelf on which the peripheral edge 129 may rest. The peripheral edge 72 of housing 70 is crimped over the peripheral edge 129 of insulating disk 120 to lock the end cap assembly in place vertically, that is, to keep it from movement in the direction of longitudinal axis 190. Crimped peripheral edge 72 forms cell shoulder 72a along the line of crimp. The end cap assembly 10 may then be subjected to radial crimping wherein mechanical force is applied to portion 71 (FIGS. 1 and 3) of the cell housing above bead 75. Such radial force may be applied by pushing a die over surface 71 from edge 72 to bead 75. Initially, the diameter of housing at surface 71 above bead 75 is greater than the diameter of the body of the housing 77 below bead 75. As radial force is applied, surface 71 is compressed inwardly causing the end flange 135 of end cap disk 130 to bite into the peripheral edge 129 of insulating disk 120. End cap 130 and insulating sealing disk 120 are thus placed in radial compression. End cap 130 functions as a radial spring, that is, maintains its radial compression and results in a tight seal even though the cell may be subjected to extremes in cold or hot climate.

The following is a description of representative chemical composition of anode 150, cathode 110 and separator 140 for alkaline cell 100 which may employed irrespective of cell size. The following chemical compositions are representative basic compositions for use in cells having the end cap assembly 10 of the present invention, and as such are not intended to be limiting.

In the above described embodiments the cathode 110 can comprise manganese dioxide, graphite and aqueous alkaline electrolyte; the anode 150 can comprise zinc and aqueous alkaline electrolyte. The aqueous electrolyte comprises a conventional mixture of KOH, zinc oxide, and gelling agent. The anode material 150 can be in the form of a gelled mixture containing mercury free (zero-added mercury) zinc alloy powder. That is, the cell can have a total mercury content less than about 50 parts per million parts of total cell weight, preferably less than 20 parts per million parts of total cell weight. The cell also preferably does not contain any added amounts of lead and thus is essentially lead-free, that is, the total lead content is less than 30 ppm, desirably less than 15 ppm of the total metal content of the anode. Such mixtures can typically contain aqueous KOH electrolyte solution, a gelling agent (e.g., an acrylic acid copolymer available under the tradename CARBOPOL C940 from B.F. Goodrich), and surfactants (e.g., organic phosphate ester-based surfactants available under the tradename GAFAC RA600 from Rhône Poulenc). Such a mixture is given only as an illustrative example and is not intended to restrict the present invention. Other representative gelling agents for zinc anodes are disclosed in U.S. Pat. No. 4,563,404.

The cathode 110 can desirably have the following composition: 87–93 wt % of electrolytic manganese dioxide (e.g., Trona D from Kerr-McGee), 2–6 wt % (total) of graphite, 5–7 wt % of a 7–10 Normal aqueous KOH solution having a KOH concentration of about 30–40 wt %; and 0.1 to 0.5 wt % of an optional polyethylene binder. The electrolytic manganese dioxide typically has an average particle size between about 1 and 100 micron, desirably between about 20 and 60 micron. The graphite is typically in the form of natural, or expanded graphite or mixtures thereof. The graphite can also comprise graphitic carbon nanofibers alone or in admixture with natural or expanded graphite. Such cathode mixtures are intended to be illustrative and are not intended to restrict this invention.

The anode material 150 comprises: Zinc alloy powder 62 to 69 wt % (99.9 wt % zinc containing 200 to 500 ppm indium as alloy and plated material), an aqueous KOH solution comprising 38 wt % KOH and about 2 wt % ZnO; a cross-linked acrylic acid polymer gelling agent available commercially under the tradename "CARBOPOL C940" from B.F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); dionyl phenol phosphate ester surfactant available commercially under the tradename "RM-510" from Rhone-Poulenc (50 ppm). The zinc alloy average particle size is desirably between about 30 and 350 micron. The bulk density of the zinc in the anode (anode porosity) is between about 1.75 and 2.2 grams zinc per cubic centimeter of anode. The percent by volume of the aqueous electrolyte solution in the anode is preferably between about 69.2 and 75.5 percent by volume of the anode.

The cell can be balanced in the conventional manner so that the mamp-hr capacity of $MnO_2$ (based on 308 mAmp-hr per gram $MnO_2$) divided by the mAmp-hr capacity of zinc alloy (based on 820 mAmp-hr per gram zinc alloy) is about 1.

The separator 140 can be a conventional ion porous separator consisting of an inner layer of a nonwoven material of cellulosic and polyvinylalcohol fibers and an outer layer of cellophane. Such a material is only illustrative and is not intended to restrict this invention. Current collector 60 is brass, preferably tin plated or indium plated brass.

Although the present invention has been described with respect to specific embodiments, it should be appreciated that variations are possible within the concept of the invention. Accordingly, the invention is not intended to be limited to the specific embodiments described herein but will be defined by the claims and equivalents thereof.

What is claimed is:

1. In an AA size alkaline cell having an open ended cylindrical housing and an end cap assembly inserted therein closing said housing, said cell having a positive and a negative terminal, said end cap assembly comprising an end cap functioning as a cell terminal and an insulating sealing member insulating the end cap from the cell housing, said insulating sealing member having an elongated electrically conductive current collector passing therethrough, the current collector being in electrical contact with the end cap, and the edge of said housing being crimped over the peripheral edge of said end cap to form a cell shoulder along the line of crimp, the improvement comprising:

the end cap assembly in said AA size cell comprising an end cap, and an insulating sealing member underlying said end cap when the cell is viewed in vertical position with the end cap assembly on top; said end cap being formed of a disk of single piece metallic construction having a convoluted surface and at least one vent aperture through its surface; wherein said end cap assembly does not include a metal disk other than said end cap within any portion of said cell housing at the open end thereof; said insulating member comprising an insulating sealing disk having a peripheral edge abutting the cell housing and electrically insulating said end cap from the cell housing; said insulating sealing disk comprising a central boss and an integrally formed radially extending arm extending from said boss; wherein said radially extending arm forms a continuous surface around said boss; said radially extending arm having a thinned portion therein forming a rupturable membrane which underlies said end cap when the cell is viewed in vertical position with the end cap assembly on top; wherein said rupturable membrane circumvents said boss circumference;

wherein at least one of the top and bottom surfaces of said radially extending arm, when viewed with the cell in vertical position with the end cap assembly on top, has an annular groove therein, wherein said annular groove circumvents said boss and forms said rupturable membrane portion at the base of said groove, said rupturable membrane circumventing said boss;

wherein when gas pressure within the cell reaches a pressure in a range between about 400 and 800 psig ($2758 \times 10^3$ and $5516 \times 10^3$ pascal gage), said membrane ruptures thereby releasing gas directly into the surrounding environment through said vent aperture in the end cap.

2. The electrochemical cell of claim 1 wherein said annular groove is located so that the leading edge of said groove, being the edge of said groove nearest the boss, is within 2 mm from said boss surface.

3. The electrochemical cell of claim 1 wherein the width of said groove at the groove base is between about 0.1 and 1.0 mm.

4. The electrochemical cell of claim 1 wherein said rupturable membrane at the base of said groove comprises nylon having a thickness between about 0.04 and 0.08 mm.

5. The electrochemical cell of claim 1 wherein the insulating sealing disk comprises nylon and the thickness of the radially extending arm comprising said rupturable membrane is between about 0.35 and 0.45 mm.

6. The electrochemical cell of claim 1 wherein said groove is formed by applying a knife to at least one of the top and bottom surfaces of said radially extending arm, wherein said knife has a V shaped cutting blade with the opposing sides of said blade forming an angle of between about 5 and 30 degrees.

7. The electrochemical cell of claim 1 wherein said groove is formed by applying a heated knife to at least one of the top and bottom surfaces of said radially extending arm.

8. The electrochemical cell of claim 1 wherein at least one of the top and bottom surfaces of said radially extending arm, when viewed with the cell in vertical position with the end cap assembly on top, has an annular groove therein, said groove formed during molding said insulating sealing disk, wherein said groove forms said rupturable membrane portion at the base of said groove, said rupturable membrane circumventing said boss.

9. The electrochemical cell of claim 8 wherein said annular groove is located so that the leading edge of said groove, being the edge of said groove nearest the boss, is within 2 mm from said boss surface.

10. The electrochemical cell of claim 8 wherein the width of said groove at the groove base is between about 0.25 and 0.4 mm.

11. The electrochemical cell of claim 8 wherein said rupturable membrane at the base of said groove comprises nylon having a thickness between about 0.15 and 0.4 mm.

12. The electrochemical cell of claim 8 wherein the insulating sealing disk comprises nylon and the thickness of the radially extending arm comprising said rupturable membrane is between about 0.35 and 0.45 mm.

13. In an AAA size alkaline cell having an open ended cylindrical housing and an end cap assembly inserted therein closing said housing, said cell having a positive and a negative terminal, said end cap assembly comprising an end cap functioning as a cell terminal and an insulating sealing member insulating the end cap from the cell housing, said insulating sealing member having an elongated electrically conductive current collector passing therethrough, the current collector being in electrical contact with the end cap, and the edge of said housing being crimped over the peripheral edge of said end cap to form a cell shoulder along the line of crimp, the improvement comprising:

the end cap assembly in said AAA size cell comprising an end cap, and an insulating sealing member underlying said end cap when the cell is viewed in vertical position with the end cap assembly on top; said end cap being formed of a disk of single piece metallic construction having a convoluted surface and at least one vent aperture through its surface; wherein said end cap assembly does not include a metal disk other than said end cap within any portion of said cell housing at the open end thereof; said insulating member comprising an insulating sealing disk having a peripheral edge abutting the cell housing and electrically insulating said end cap from the cell housing; said insulating sealing disk comprising a central boss and an integrally formed radially extending arm extending from said boss; wherein said radially extending arm forms a continuous surface around said boss; said radially extending arm having a thinned portion therein forming a rupturable membrane which underlies said end cap when the cell is viewed in vertical position with the end cap assembly on top; wherein said rupturable membrane circumvents said boss circumference;

wherein at least one of the top and bottom surfaces of said radially extending arm, when viewed with the cell in vertical position with the end cap assembly on top, has an annular groove therein, wherein said annular groove circumvents said boss and forms said rupturable membrane portion at the base of said groove, said rupturable membrane circumventing said boss;

wherein when gas pressure within the cell reaches a pressure in a range between about 500 and 900 psig ($3448 \times 10^3$ and $6206 \times 10^3$ pascal gage), said membrane ruptures thereby releasing gas directly into the surrounding environment through said vent aperture in the end cap.

14. The electrochemical cell of claim 13 wherein said annular groove is located so that the leading edge of said groove, being the edge of said groove nearest the boss, is within 2 mm from said boss surface.

15. The electrochemical cell of claim 13 wherein the width of said groove at the groove base is between about 0.1 and 1.0 mm.

16. The electrochemical cell of claim 13 wherein said rupturable membrane at the base of said groove comprises nylon having a thickness between about 0.04 and 0.08 mm.

17. The electrochemical cell of claim 13 wherein the insulating sealing disk comprises nylon and the thickness of the radially extending arm comprising said rupturable membrane is between about 0.35 and 0.45 mm.

18. The electrochemical cell of claim 13 wherein said groove is formed by applying a knife to at least one of the top and bottom surfaces of said radially extending arm, wherein said knife has a V shaped cutting blade with the opposing sides of said blade forming an angle of between about 5 and 30 degrees.

19. The electrochemical cell of claim 13 wherein said groove is formed by applying a heated knife to at least one of the top and bottom surfaces of said radially extending arm.

20. The electrochemical cell of claim 13 wherein at least one of the top and bottom surfaces of said radially extending arm, when viewed with the cell in vertical position with the end cap assembly on top, has an annular groove therein, said groove formed during molding said insulating sealing disk, wherein said groove forms said rupturable membrane portion at the base of said groove, said rupturable membrane circumventing said boss.

21. The electrochemical cell of claim 20 wherein said annular groove is located so that the leading edge of said groove, being the edge of said groove nearest the boss, is within 2 mm from said boss surface.

22. The electrochemical cell of claim 20 wherein the width of said groove at the groove base is between about 0.25 and 0.4 mm.

23. The electrochemical cell of claim 20 wherein said rupturable membrane at the base of said groove comprises nylon having a thickness between about 0.15 and 0.4 mm.

24. The electrochemical cell of claim 20 wherein the insulating sealing disk comprises nylon and the thickness of the radially extending arm comprising said rupturable membrane is between about 0.35 and 0.45 mm.

25. In a C size alkaline cell having an open ended cylindrical housing and an end cap assembly inserted therein closing said housing, said cell having a positive and a negative terminal, said end cap assembly comprising an end cap functioning as a cell terminal and an insulating sealing member insulating the end cap from the cell housing, said insulating sealing member having an elongated electrically conductive current collector passing therethrough, the current collector being in electrical contact with the end cap, and the edge of said housing being crimped over the peripheral edge of said end cap to form a cell shoulder along the line of crimp, the improvement comprising:

the end cap assembly in said C size cell comprising an end cap, and an insulating sealing member underlying said end cap when the cell is viewed in vertical position with the end cap assembly on top; said end cap being formed of a disk of single piece metallic construction having a convoluted surface and at least one vent aperture through its surface; wherein said end cap assembly does not include a metal disk other than said end cap within any portion of said cell housing at the open end thereof; said insulating member comprising an insulating sealing disk having a peripheral edge abutting the cell housing and electrically insulating said end cap from the cell housing; said insulating sealing disk comprising a central boss and an integrally formed radially extending arm extending from said boss; wherein said radially extending arm forms a continuous surface around said boss; said radially extending arm having a thinned portion therein forming a rupturable membrane which underlies said end cap when the cell is viewed in vertical position with the end cap assembly on top; wherein said rupturable membrane circumvents said boss circumference;

wherein at least one of the top and bottom surfaces of said radially extending arm, when viewed with the cell in vertical position with the end cap assembly on top, has an annular groove therein, wherein said annular groove circumvents said boss and forms said rupturable membrane portion at the base of said groove, said rupturable membrane circumventing said boss;

wherein when gas pressure within the cell reaches a pressure in a range between about 200 and 400 psig ($1379 \times 10^3$ and $2758 \times 10^3$ pascal gage), said membrane ruptures thereby releasing gas directly into the surrounding environment through said vent aperture in the end cap.

26. The electrochemical cell of claim 25 wherein said annular groove is located so that the leading edge of said groove, being the edge of said groove nearest the boss, is within 2 mm from said boss surface.

27. The electrochemical cell of claim 25 wherein the width of said groove at the groove base is between about 0.1 and 1.0 mm.

28. The electrochemical cell of claim 25 wherein said rupturable membrane at the base of said groove comprises nylon having a thickness between about 0.04 and 0.08 mm.

29. The electrochemical cell of claim 25 wherein the insulating sealing disk comprises nylon and the thickness of the radially extending arm comprising said rupturable membrane is between about 0.35 and 0.45 mm.

30. The electrochemical cell of claim 25 wherein said groove is formed by applying a knife to at least one of the top and bottom surfaces of said radially extending arm, wherein said knife has a V shaped cutting blade with the opposing sides of said blade forming an angle of between about 5 and 30 degrees.

31. The electrochemical cell of claim 25 wherein said groove is formed by applying a heated knife to at least one of the top and bottom surfaces of said radially extending arm.

32. The electrochemical cell of claim 25 wherein at least one of the top and bottom surfaces of said radially extending arm, when viewed with the cell in vertical position with the end cap assembly on top, has an annular groove therein, said groove formed during molding said insulating sealing disk, wherein said groove forms said rupturable membrane portion at the base of said groove, said rupturable membrane circumventing said boss.

33. The electrochemical cell of claim 32 wherein said annular groove is located so that the leading edge of said groove, being the edge of said groove nearest the boss, is within 2 mm from said boss surface.

34. The electrochemical cell of claim 32 wherein the width of said groove at the groove base is between about 0.25 and 0.4 mm.

35. The electrochemical cell of claim 32 wherein said rupturable membrane at the base of said groove comprises nylon having a thickness between about 0.15 and 0.4 mm.

36. The electrochemical cell of claim 32 wherein the insulating sealing disk comprises nylon and the thickness of the radially extending arm comprising said rupturable membrane is between about 0.35 and 0.45 mm.

37. In a D size alkaline cell having an open ended cylindrical housing and an end cap assembly inserted therein closing said housing, said cell having a positive and a negative terminal, said end cap assembly comprising an end cap functioning as a cell terminal and an insulating sealing member insulating the end cap from the cell housing, said insulating sealing member having an elongated electrically conductive current collector passing therethrough, the current collector being in electrical contact with the end cap, and the edge of said housing being crimped over the peripheral edge of said end cap to form a cell shoulder along the line of crimp, the improvement comprising:

the end cap assembly in said D size cell comprising an end cap, and an insulating sealing member underlying said end cap when the cell is viewed in vertical position with the end cap assembly on top; said end cap being formed of a disk of single piece metallic construction having a convoluted surface and at least one vent aperture through its surface; wherein said end cap assembly does not include a metal disk other than said end cap within any portion of said cell housing at the open end thereof; said insulating member comprising an insulating sealing disk having a peripheral edge abutting the cell housing and electrically insulating said end cap from the cell housing; said insulating sealing disk comprising a central boss and an integrally formed radially extending arm extending from said boss; wherein said radially extending arm forms a continuous surface around said boss; said radially extending arm having a thinned portion therein forming a rupturable membrane which underlies said end cap when the cell is viewed in vertical position with the end cap assembly on top; wherein said rupturable membrane circumvents said boss circumference;

wherein at least one of the top and bottom surfaces of said radially extending arm, when viewed with the cell in vertical position with the end cap assembly on top, has an annular groove therein, wherein said annular groove circumvents said boss and forms said rupturable membrane portion at the base of said groove, said rupturable membrane circumventing said boss;

wherein when gas pressure within the cell reaches a pressure in a range between about 150 and 250 psig ($1034 \times 10^3$ and $1724 \times 10^3$ pascal gage), said membrane ruptures thereby releasing gas directly into the surrounding environment through said vent aperture in the end cap.

38. The electrochemical cell of claim 37 wherein said annular groove is located so that the leading edge of said groove, being the edge of said groove nearest the boss, is within 2 mm from said boss surface.

39. The electrochemical cell of claim 37 wherein the width of said groove at the groove base is between about 0.1 and 1.0 mm.

40. The electrochemical cell of claim 37 wherein said rupturable membrane at the base of said groove comprises nylon having a thickness between about 0.04 and 0.08 mm.

41. The electrochemical cell of claim 37 wherein the insulating sealing disk comprises nylon and the thickness of the radially extending arm comprising said rupturable membrane is between about 0.35 and 0.45 mm.

42. The electrochemical cell of claim 37 wherein said groove is formed by applying a knife to at least one of the top and bottom surfaces of said radially extending arm, wherein said knife has a V shaped cutting blade with the opposing sides of said blade forming an angle of between about 5 and 30 degrees.

43. The electrochemical cell of claim 37 wherein said groove is formed by applying a heated knife to at least one of the top and bottom surfaces of said radially extending arm.

44. The electrochemical cell of claim 37 wherein at least one of the top and bottom surfaces of said radially extending arm, when viewed with the cell in vertical position with the end cap assembly on top, has an annular groove therein, said groove formed during molding said insulating sealing disk, wherein said groove forms said rupturable membrane portion at the base of said groove, said rupturable membrane circumventing said boss.

45. The electrochemical cell of claim 44 wherein said annular groove is located so that the leading edge of said groove, being the edge of said groove nearest the boss, is within 2 mm from said boss surface.

46. The electrochemical cell of claim 44 wherein the width of said groove at the groove base is between about 0.25 and 0.4 mm.

47. The electrochemical cell of claim 44 wherein said rupturable membrane at the base of said groove comprises nylon having a thickness between about 0.15 and 0.4 mm.

48. The electrochemical cell of claim 44 wherein the insulating sealing disk comprises nylon and the thickness of the radially extending arm comprising said rupturable membrane is between about 0.35 and 0.45 mm.

* * * * *